United States Patent [19]
Chapman

[11] Patent Number: 6,026,871
[45] Date of Patent: Feb. 22, 2000

[54] STUMP CUTTER SAFETY SYSTEM

[76] Inventor: Bruce Chapman, Rayco Manufacturing, Inc., 4255 Lincoln Way E., Wooster, Ohio 44691

[21] Appl. No.: 09/281,200

[22] Filed: Mar. 30, 1999

[51] Int. Cl.[7] .............................. B27B 1/00; A01G 23/06
[52] U.S. Cl. ........................ 144/356; 37/302; 144/24.12; 144/334; 144/382; 173/28
[58] Field of Search ................. 144/24.12, 334, 144/356, 382; 37/302; 173/28, 193

[56] References Cited

U.S. PATENT DOCUMENTS

| | | | |
|---|---|---|---|
| 2,754,087 | 7/1956 | Johnson | 173/28 |
| 2,912,022 | 11/1959 | Verb Ploeg et al. | 144/24.12 |
| 3,308,860 | 3/1967 | DeShano . | |
| 3,336,958 | 8/1967 | Carlton . | |
| 3,431,983 | 3/1969 | Jacobson | 173/193 |
| 3,568,740 | 3/1971 | Speakman . | |
| 3,685,557 | 8/1972 | Groce . | |
| 4,271,879 | 6/1981 | Shivers, Jr. et al. . | |
| 4,402,352 | 9/1983 | Hodges . | |
| 4,703,786 | 11/1987 | Doskocil . | |
| 4,783,914 | 11/1988 | Bowling . | |
| 5,289,859 | 3/1994 | Minton, Jr. et al. . | |
| 5,588,474 | 12/1996 | Egging . | |
| 5,845,689 | 12/1998 | Egging et al. . | |

*Primary Examiner*—W. Donald Bray

[57] ABSTRACT

A safety system for a stump cutter machine which comprises a swing out operator's control console equipped with an interlock to prevent rotation of the stump cutter wheel when not locked into the operating configuration, and a restraint means to hinder and prevent full use of the controls when the stump cutter is not in the operating configuration.

18 Claims, 7 Drawing Sheets

STUMP CUTTER SAFETY SYSTEM

The present invention relates generally to a safety system for a stump cutter machine. More particularly, this invention relates to a swing out operator's control console with an interlock feature and an operator restraint and standoff means which prevent the operator from using the stump cutter if the control console is not positioned in the correct operating configuration.

BACKGROUND OF THE ART

The prior art provides various examples of stump cutters. Some of the prior art devices place the operator directly behind the machine in order to keep the operator as far away from the cutting wheel as possible which results in the operator having no clear view of what he is doing. Some of these machines use safety levers on the handles that shut down the machine if the operator is not grasping them, this results in forcing the operator to remain in a position where he cannot directly view what he is cutting. Other devices use a see-through safety shield to protect the upper torso of the operator from cutting wheel discharge while the operator stands to the side of the stump cutter. The cutting wheel travel comes hazardously close to the underside of the shield which does not provide any standoff means to ensure the operator remains at a safe distance from the cutting wheel. Two other systems use a control console which can move into positions providing better views, but one is capable of moving into a hazardous position near the cutting wheel while the other is too far from the cutting wheel to allow proper operator control. Neither system uses any safety devices or systems.

A problem with stump cutters has been the proper positioning of the operator to optimize both the operator's view of the cutter and the location of the operator far enough away from the cutter for safety considerations. Many of these devices have substituted ease of use or simplification of design at the cost of safety, while others have misplaced the operator in a position where the operator can not properly view and thereby control the cutting wheel.

The present invention overcomes these disadvantages by balancing proper operator positioning with protective shielding and lock-out safety devices to prevent unsafe use of the stump cutter.

SUMMARY OF THE INVENTION

The present invention provides a swing out operator's control console for a stump cutter apparatus wherein the control console is equipped with a safety system intended to protect the operator and prevent improper use while allowing the operator an optimized view of the cutting wheel during operation. The control console swings back in alignment with the stump cutter to stow away in a travel or storage configuration when not in use.

The safety system apparatus herein described encourages the operator to control the stump cutter at an optimized position for viewing and controlling the cutting wheel while keeping the operator at a safe distance. This safety system consists of a swing out operator's control console with two novel safety features; 1) an interlock system; and 2) an operator restraint/standoff means. Each of these features may independently be used to prevent the operation of the stump cutter unless the control console safety system is in the proper configuration. The stump cutter of the present invention will not operate unless the swing out console is properly pulled out and latched in a predetermined operating position, encouraging the operator to stand a safe distance from the cutter wheel while allowing an optimized view of the cutting wheel. In the preferred embodiment, an interlock inactivates or shuts down the stump cutter if the operator attempts to engage the cutter wheel while the control console is not in the operating (pulled out and latched) position. Shut down of the stump cutter by the interlock can be accomplished by, but not limited to, shutting down the engine fuel solenoid, disengaging and braking the cutter wheel, or suspending ignition of the engine. The control console of the present invention is further equipped with an operator restraint/standoff means. In the preferred embodiment, a metallic bar functions both as the restraint and standoff means. In the vertical or retracted position, the bar projects out from the side of the console and travels up and across the top of the control console thus preventing clear physical access to at least some of the controls, most preferably those associated with operation of the cutter wheel. The restraint bar has a welded projection that at least partially blocks movement of control levers such as the boom lift and boom swing control levers of the control console. The operator cannot raise the cutter boom or swing the cutter boom from its travel position toward the operator with the restraint bar in this position. This effectively prevents the operator from cutting stumps with the restraint bar in its retracted position. The restraint bar is rotatable out and away to a down or extended position where it is preferably latched at approximately thigh high level. When the restraint bar is latched in the down position, it projects out from the control console and acts as a standoff thus making it difficult for an operator to put his feet under the control console which is closer to the cutter wheel.

The control console safety system is easily stowed in a storage or travel configuration. The restraint bar is rotated up and across the control console where it hinders access to the controls such as blocking movement of the boom lift and boom swing control levers. Rotating the restraint bar to the up position also reduces the machine width which make it easier for the stump cutter to be maneuvered around or through obstacles. In the preferred embodiment, the control console is pushed in and latched in a position such that the longitudinal axis of the console is parallel to the travel axis of the stump cutter. This further reduces the machine width which make it easier for the stump cutter to be maneuvered around or through obstacles. It is envisioned that the safety system could be used with other positionable control consoles which may not swing into position.

BRIEF DESCRIPTION OF THE DRAWINGS

Better understanding of the present invention will be had when reference is made to the accompanying drawings, wherein identical parts are identified with identical reference numerals, and wherein.

DETAILED DESCRIPTION OF THE DRAWINGS

Figure 1:
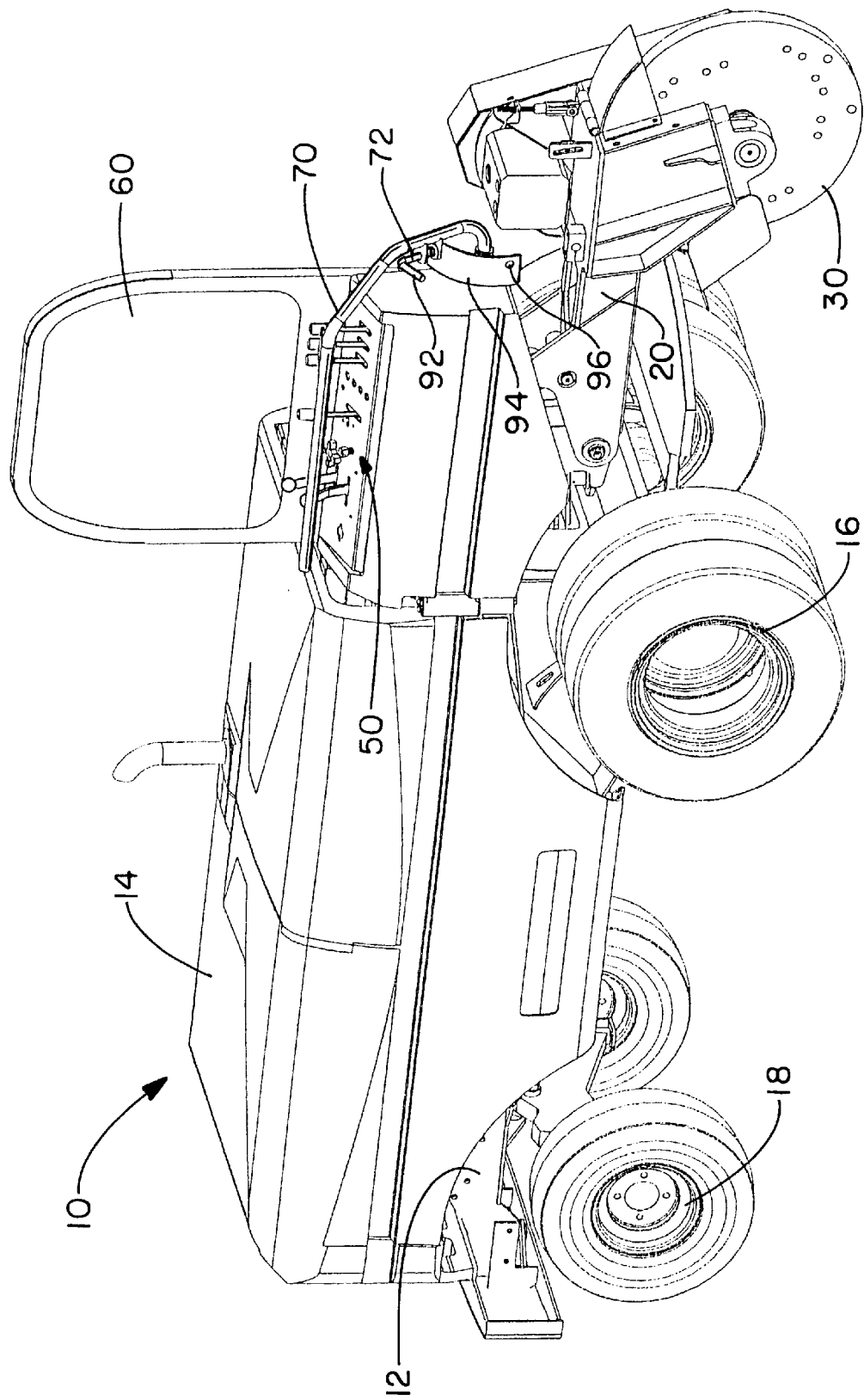
FIG. 1 shows a perspective view of the stump cutter and safety system control console in the travel configuration.

The present invention is depicted in both a travel configuration and an operating configuration on a representative stump cutter device 10. Referring to FIG. 1, a typical self-propelled stump cutter 10 is shown in association with the safety system control console 50 in the travel configuration. The stump cutter device 10 generally comprises a frame 12 supporting the engine (not shown) and various hydraulic components (not shown) which are enclosed by a body cover 14. The stump cutter engine is typically diesel but can be gasoline or other types. The drive wheels 16 of the stump cutter 10 are shown underneath the control console 50. The non-driven wheels 18 are shown toward the rear of the stump cutter 10. The cutting boom 20 projects out forward of the stump cutter 10. The cutting boom 20 has mounted at its outermost end a cutter wheel 30 shown in the drawing without the individual cutting teeth which are normally attached thereto. An operator upper body safety shield 60 is shown projected vertically above the control console 50. The shield 60 preferably is transparent in its central region. The control console 50 has various controls on the top surface in a typical control layout 52. A restraint bar 70 projects out of the front end of the control console 50 and extends across and in front of the control layout 52 in a manner hindering access to at least certain controls. The restraint bar 70 is locked in position by the restraint bar lock 72. Restraint bar lock 72 comprises a spring loaded rod 92 attached to the restraint bar 70 and a receiver portion 94 fixably attached to the control console about a support of the restraint bar 70. The rod 92 is biased toward the receiving portion 94 by the spring. A mating end of the spring loaded rod 92 fits through two apertures 96 on the receiver portion 94 at predetermined locations corresponding to the restraint bar 70 operating position and the restraint bar 70 travel position. The restraint bar 70 is moved between the two positions by pulling the spring loaded rod 92 out of one aperture 96, rotating the restraint bar 70 to the other position where the spring loaded rod 92 will engage the other aperture 96 and lock the restraint bar 70 into place. This type of locking device is known and would be easily constructed by one of ordinary skill in the art.

Figure 2:
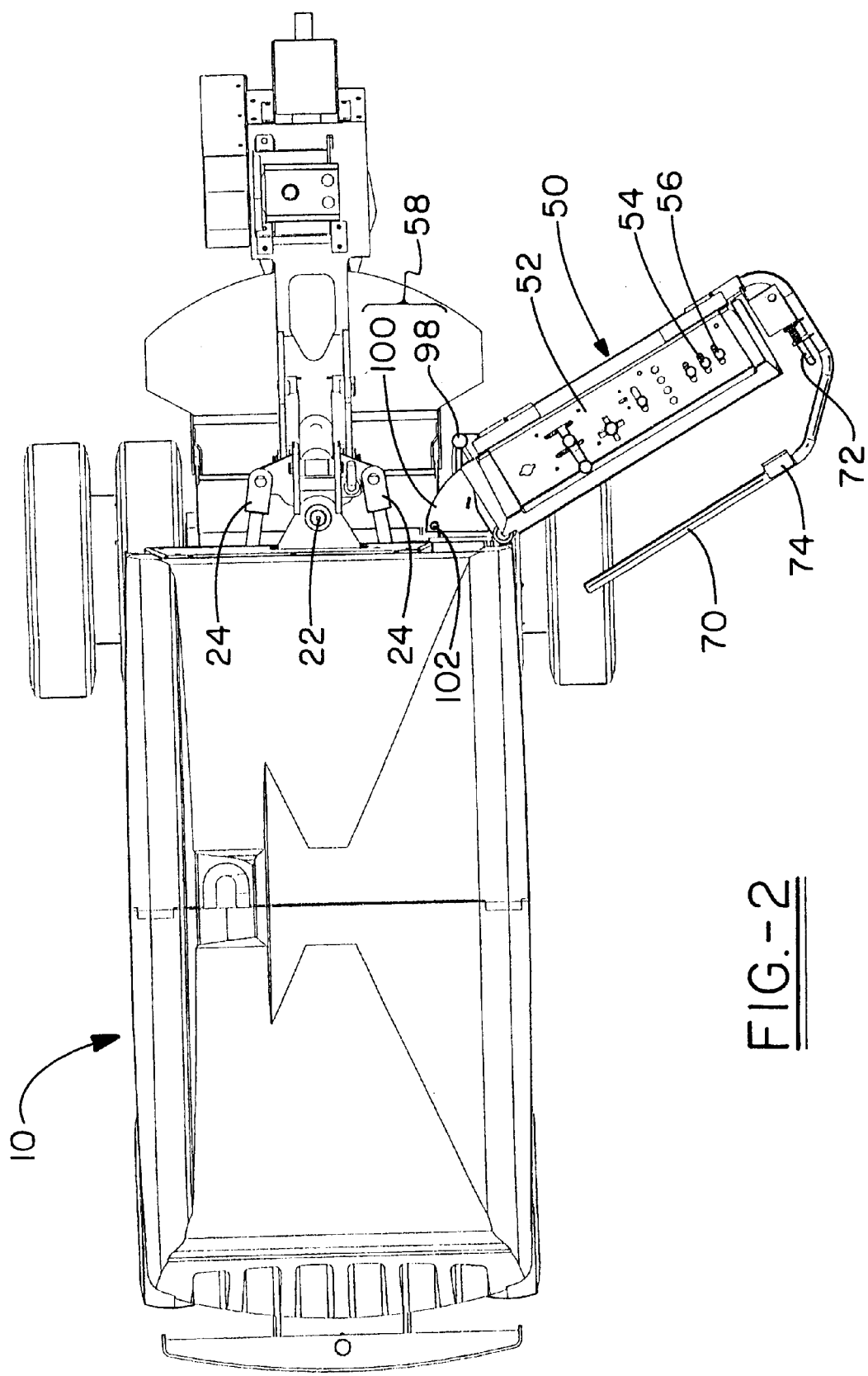
FIG. 2 shows a top view of the stump cutter and safety system control console in the operating configuration.
Figure 3:
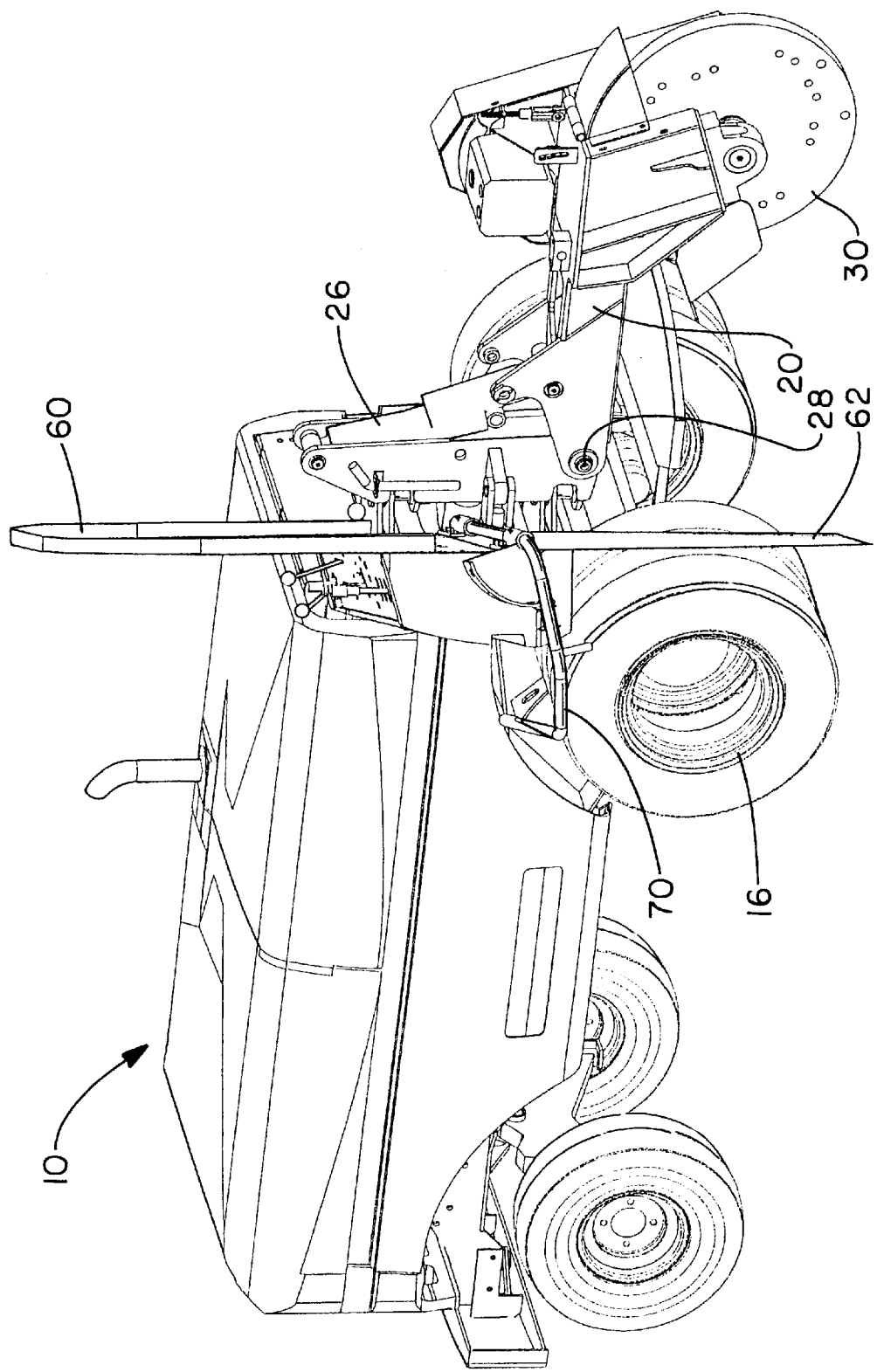
FIG. 3 shows perspective view of the stump cutter and safety system control console in the operating configuration.

The cut configuration of the stump cutter device 10 is shown in a top view in FIG. 2. The operator control console 50 is swung out (rotated clockwise) away from the cutting boom 20 and locked into a safe operating position by a control console latch 58 located on the left side of the operator control console 50 on the cutter boom side of the operator control console. The control console latch 58 is similar to the restraint bar latch 74 in that the latch comprises a rod 98 which engages one of two apertures 102 on a receiving portion 100 at predetermined locations corresponding to the operator console 50 operating position and the operator console 50 travel position. This type of locking device is known and would be easily constructed by one of ordinary skill in the art. The restraint bar 70 is rotated down (counterclockwise) by the operator to a position in front of the control console 50 which forces the operator to stand back and away from the control console. The restraint bar 70 is locked in position by the restraint bar lock 72. The vertical boom control lever 54 and the horizontal boom sweep control lever 56 are shown at the far right side of the control layout 52. The cutting boom 20 sweeps from side to side about a pivot point 22 controlled by actuation of the hydraulic cylinder actuators 24 attached to both sides of the boom. The vertical position of the cutting boom 20 is preferably controlled by a single hydraulic cylinder actuator 26 which rotates the cutter boom up and down about a second pivot point 28 as best shown in FIG. 3. In operation, the cutter wheel 30 rotates in a manner that the teeth cut away chunks of the tree stump. The cutting boom 20 swings from side to side to cut the full width or a portion of the width of a tree stump. The drive wheels 16 are engaged by the operator to move the entire stump cutter 10 forward or reverse to move the sweep of the cutter wheel 30 to an uncut portion of the stump. The depth of the cut is controlled by the vertical positioning of the cutting boom 20. Also depicted in FIG. 3 is a rubber safety curtain 62 extending down from the control console 50 in a manner protecting the operator's lower body from discharge from the cutter wheel 30. Rubber safety curtains are known in the art as protection devices. The storage of safety curtain 62 is preferably accomplished by folding the safety curtain 62 up behind the control console 50 when in the travel configuration (not shown).

Figure 4:
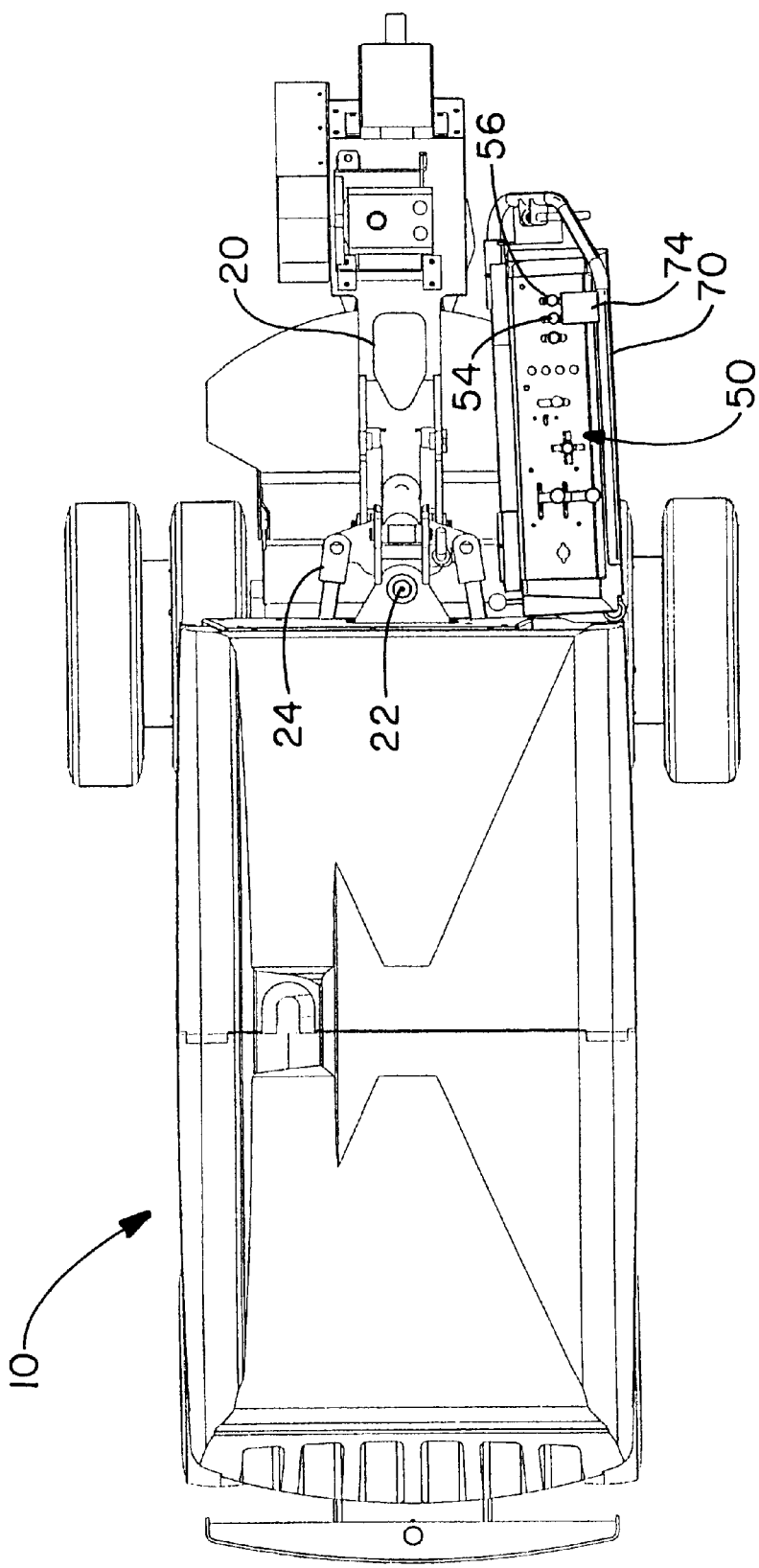
FIG. 4 shows a top view of the stump cutter and safety system control console in the travel configuration.

FIG. 4 shows the top view of the stump cutter 10 and the safety control console 50 in the travel configuration. In this configuration, the control console 50 is parallel to the cutting boom 20 and in-line with the rest of the stump cutter 10. The control console is locked into position by the control console latch 58. A projection 74 is shown attached to the restraint bar 70 so that it partially blocks the vertical boom control lever 54 and the horizontal boom sweep control lever 56 of the control console 50. The projection 74 is welded to the restraint bar 70 in a manner that the projection abuts against the control levers 54, 56 and thus preventing upward movement of the cutter boom and also preventing the boom from sweeping toward the operator.

Figure 5:
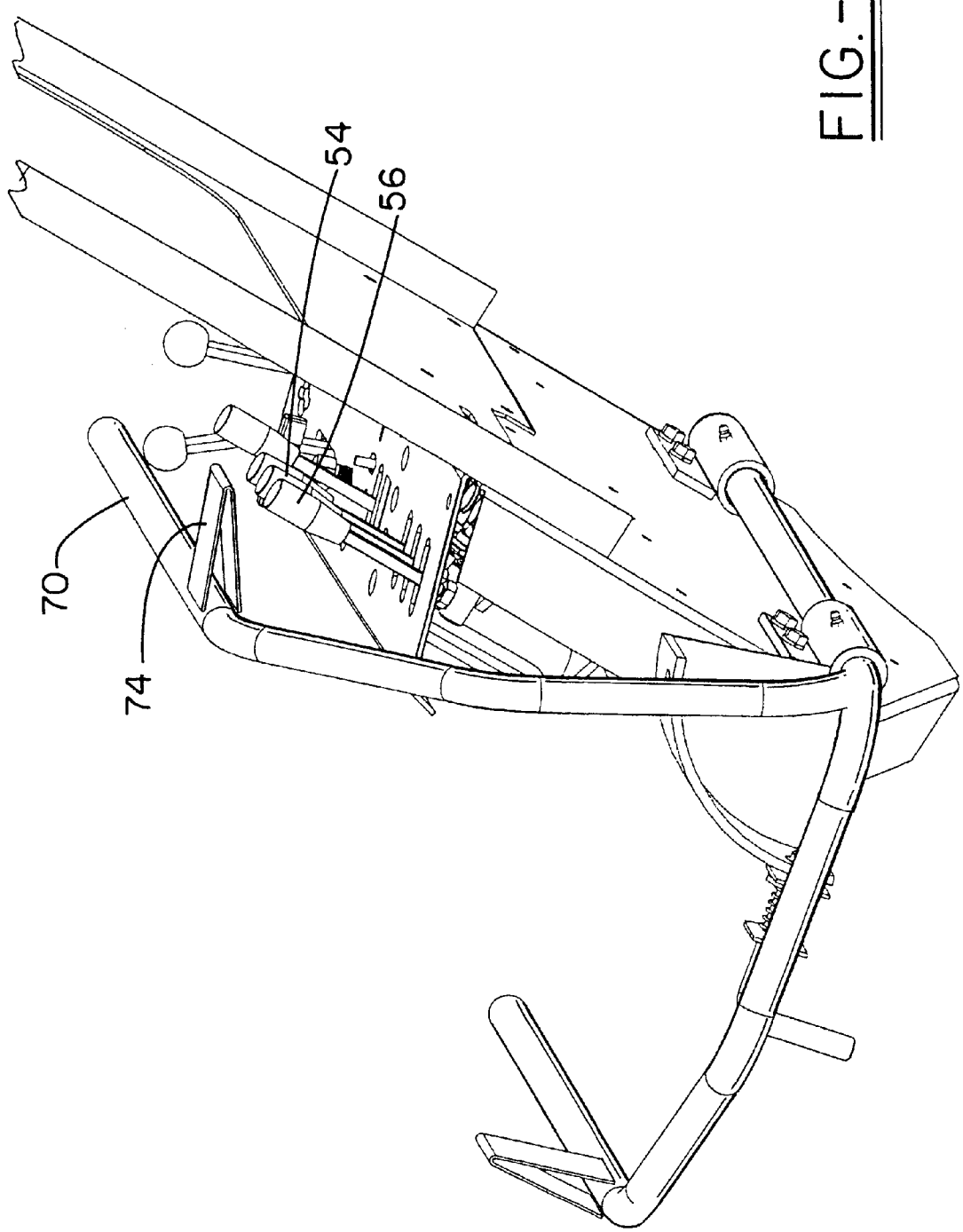
FIG. 5 shows an alternate configuration of the restraint bar projection.

In another embodiment as shown in FIG. 5, the projection 74 is attached to the restraint bar 70 in a manner preventing vertical access to the control levers 54, 56, thus limiting operator access to these controls when the restraint bar is in the traveling configuration. It is to be appreciated that any number or type of cutter wheel operations could be covered or obstructed by projection 74 in accomplishing the purposes of the invention. Furthermore, it is the purpose of the restraint bar 70 to ensure that the operator can not operate the stump cutter 10 from the travel configuration, but rather takes the time to put the restraint bar 70 into its outwardly rotated and fully locked operating position.

Figure 6:
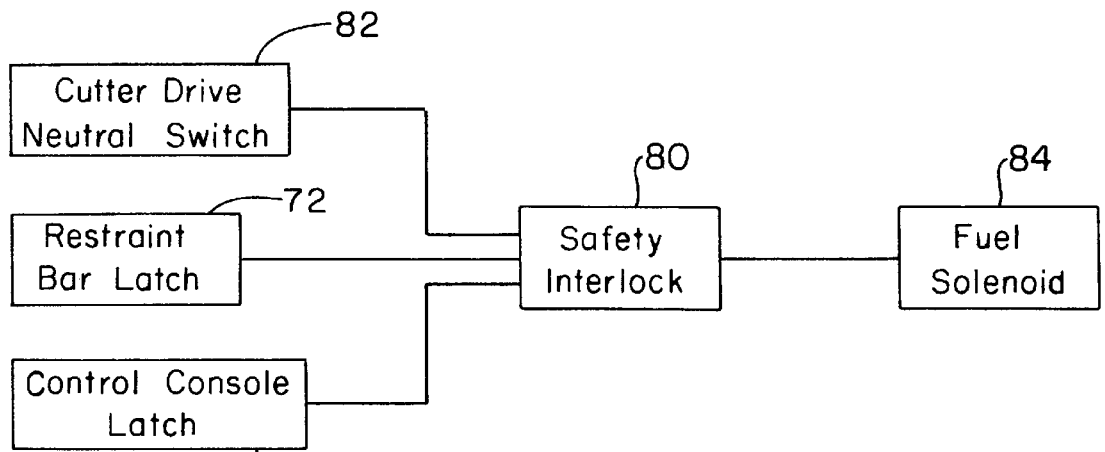
FIG. 6 shows a block diagram of the interlock circuit.

An interlock 80 is used to prevent the use of the stump cutter wheel 30 when the stump cutter 10 is not in the proper operating configuration. The interlock 80 preferably will be comprised of relays, digital logic circuits or even microprocessor controlled, all of which are known in the art and can easily be used or interchanged for simple state detection and on/off control. FIG. 6 shows in a block diagram format, a first arrangement by which the safety interlock 80 of the present invention may be employed with known stump cutter components. The safety interlock 80 is shown connected to the neutral switch of the cutter drive 82, the safety latch 58 of the swing out control console 50, the restraint bar lock 72 and the fuel solenoid 84 of the engine. In the preferred embodiment, the interlock "senses" whether the control console 50 is in the operating position by a micro switch attached in the corresponding aperture 102 of the safety latch 58 and engaged by the rod 98 when the control console is in the operating configuration. By the same manner, the interlock can also be configured to determine whether the restraint bar 70 is in the operating position by a micro switch attached in the corresponding aperture 96 of the safety latch 72 and engaged by the spring loaded rod 92 when the restraint bar 70 is in the operating configuration. The interlock 80 will shut off the fuel solenoid 84 if the neutral switch of the cutter drive 82 is on and the swing out control console 50 is not latched out in the proper safe operating position or the restraint bar 70 is not in its outwardly rotated and fully locked operating position.

Figure 7:
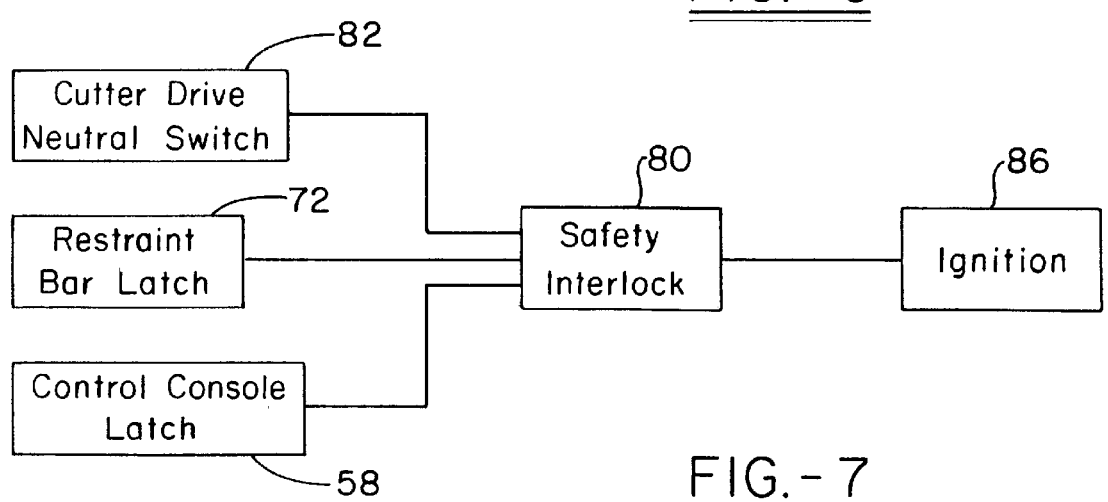
FIG. 7 shows a block diagram of an alternate configuration of the interlock circuit.

Referring to FIG. 7, an alternate embodiment is shown for gasoline models. FIG. 7 shows in a block diagram format, a second arrangement by which the safety interlock 80 of the present invention may be employed with known stump cutter components. The safety interlock 80 will shut off the ignition 86 of the engine if the neutral switch of the cutter drive 82 is on and the swing out control console 50 is not latched out in the proper safe operating position or the restraint bar 70 is not in its outwardly rotated and fully locked operating position.

Figure 8:
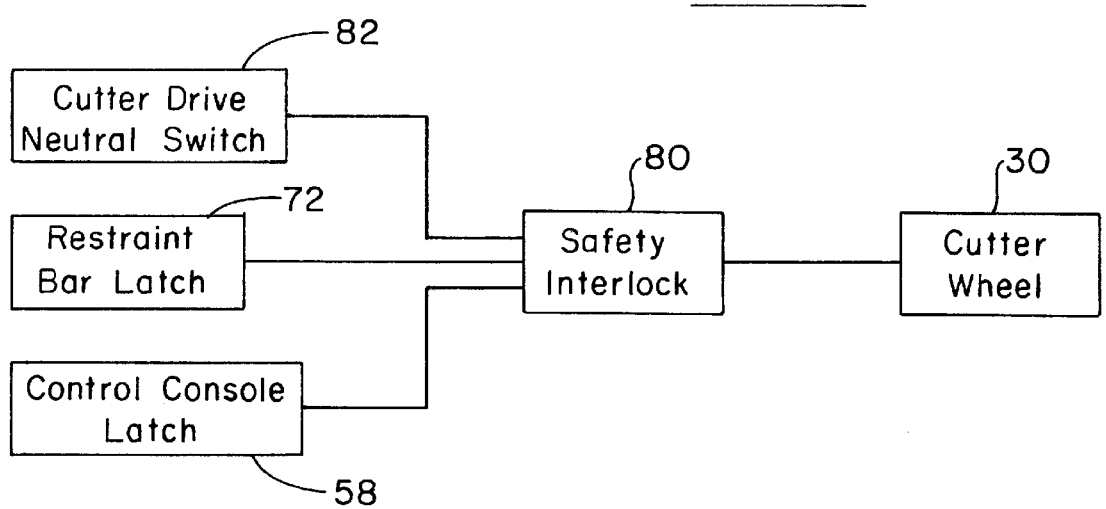
FIG. 8 shows a block diagram of an alternate configuration of the interlock circuit.

In still another alternate embodiment, FIG. 8 shows in a block diagram format, a third arrangement by which the safety interlock 80 of the present invention may be employed with known stump cutter components. The safety interlock 80 disengages the cutter wheel 30 if the neutral switch of the cutter drive 82 is on and the swing out control console 50 is not latched out in the proper safe operating position or the restraint bar 70 is not in its outwardly rotated and fully locked operating position.

Figure 9:
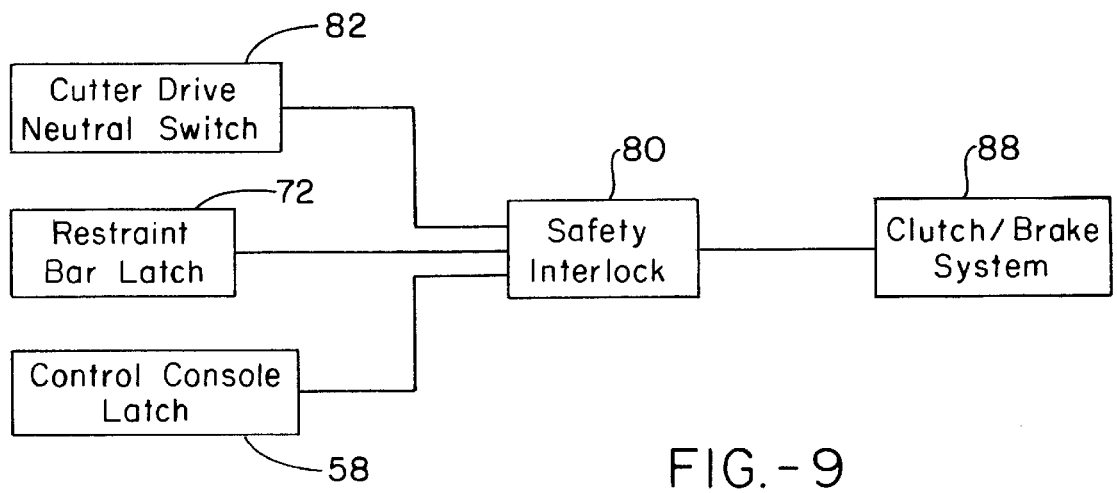
FIG. 9 shows a block diagram of an alternate configuration of the interlock circuit.

In yet another alternate embodiment as shown in FIG. 9 in a block diagram format, a fourth arrangement by which the safety interlock 80 of the present invention may be employed with known stump cutter components. The safety interlock 80 actuates a cutter wheel clutch/brake system 88 to disengage and stop cutter wheel 30 if the neutral switch of the cutter drive 82 is on and the swing out control console 50 is not latched out in the proper safe operating position or the restraint bar 70 is not in its outwardly rotated and fully locked operating position. Cutter clutch/brake systems are known and would be easily constructed by one of ordinary skill in the art.

Figure 10:
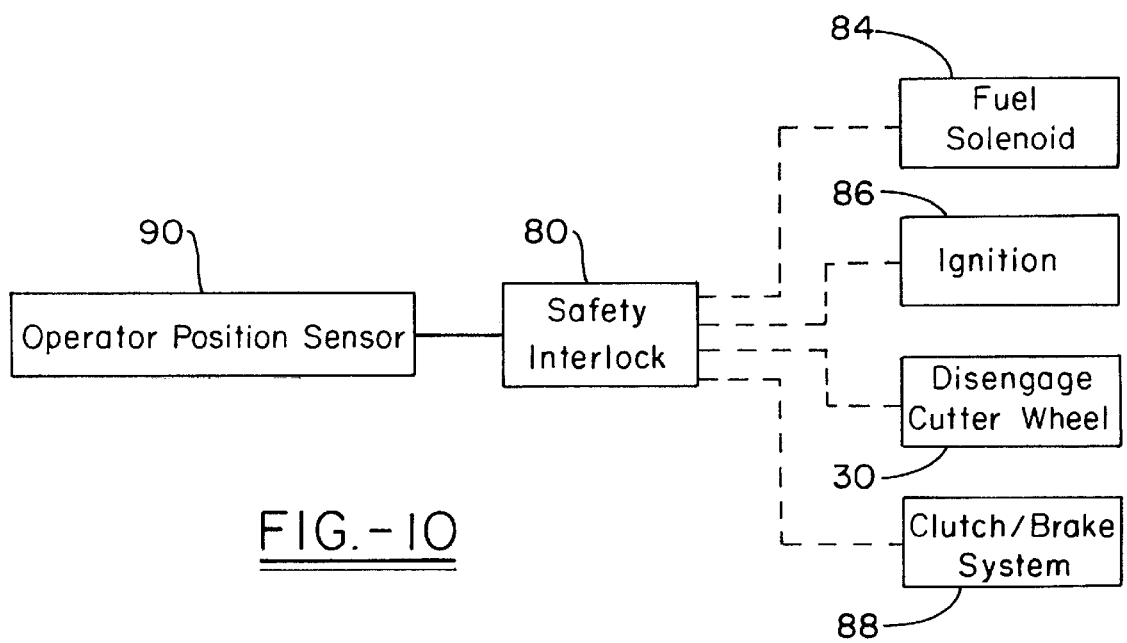
FIG. 10 shows a block diagram of an alternate configuration of the interlock circuit utilizing an operator position sensor.

Another embodiment as shown in FIG. 10 in a block diagram format, the interlock 80 is connected to a sensor 90 which detects the presence of the operator behind the operator console and disables the cutter wheel 30 by one of the methods specified above, if the operator is not detected. The sensor 90 may be any known sensor such as a proximity detector which is incorporated into the interlock 80 by known means. When operation of the cutter wheel is complete and the console taken out of the safe operating position, any of the above illustrated interlocks will prevent unsafe or accidental operation of the cutter wheel. Furthermore, the restraint bar 70 is moved to its upward or retracted position to prevent access to cutter boom controls. While it is preferred that these safety features be used in tandem, it is contemplated that either may be used independent of the other. It is contemplated that the disabling method be one or more of the specified actions or any other non-specified method.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A safety system for a stump cutter comprising;
   a positionable operator's control console having an operating configuration and a travel configuration,
   an interlock control to prevent operation as a function of rotation of a cutter wheel of the stump cutter when the control console is not securely positioned in said operating configuration,
   a positionable restraint means which at least hinders access to a control of said stump cutter when in said travel configuration and which projects outward from the control console when in said operating configuration.

2. A safety system as recited in claim 1, wherein said operator's control console is pivotable out and away from the side of the stump cutter to said operating configuration.

3. A safety system as recited in claim 1, wherein the travel position of the operator's control console is in-line with the longitudinal stump cutter.

4. A safety system as recited in claim 1, wherein a latch is used to secure the operator's control console in the operating and travel configurations.

5. A safety system as recited in claim 1, wherein said interlock control is an electrical circuit.

6. A safety system as recited in claim 1, wherein said interlock control blocks an engine fuel solenoid of the stump cutter if the stump cutter control console and restraint means are not positioned and secured in said operating configuration.

7. A safety system as recited in claim 1, wherein said interlock control suspends ignition to the stump cutter engine if the stump cutter control console and restraint means are not positioned and secured in said operating configuration.

8. A safety system as recited in claim 5, wherein said electrical circuit disengages the cutter wheel if the stump cutter control console and restraint means are not positioned and secured in said operating configuration.

9. A safety system as recited in claim 5, wherein said electrical circuit actuates a cutter wheel clutch/brake system if the stump cutter control console and restraint means are not positioned and secured in said operating configuration.

10. A safety system as recited in claim 1, wherein said restraint means is a bar.

11. A safety system as recited in claim 10, wherein a projection is fixedly attached to said bar such that it at least partially blocks access to at least one control lever when the bar is in the travel configuration.

12. A safety system as recited in claim 11, wherein said at least one control lever controls said cutter boom.

13. A safety system as recited in claim 1, wherein a latch is used to secure the restraint means in the operating and travel configurations.

14. A safety system as recited in claim 1, wherein said interlock is controlled by a sensor.

15. A stump cutter safety interlock control comprising;
   a means of sensing whether an operator's control console is positioned and latched in a predetermined operating configuration;
   a means of sensing whether a cutter wheel is engaged; and
   a means to prevent operation of a cutter wheel of said stump cutter when said cutter wheel is engaged and said control console is not positioned and latched in a predetermined operating configuration.

16. A stump cutter operator restraint/standoff means comprising;
   a bar having an operating position and a travel position;

wherein said bar at least hinders access to at least one stump cutter control lever when in said travel position;

wherein said bar projects outward from a stump cutter control console when in said operating configuration; and a means to prevent operation of a cutter wheel of said stump cutter when the bar is not in said operating position.

17. A stump cutter operator restraint/standoff means as recited in claim 16, wherein said at least one stump cutter control lever controls said cutter boom.

18. A method for ensuring safe use of a stump cutter comprising the steps of:

a) detecting whether a positionable operator's control console is positioned and latched in a predetermined operating configuration;

b) compelling the use of a positionable restraint/standoff means by at least hindering access to the controls of a stump cutter when said restraint/standoff means is positioned in a travel configuration and allowing free access to said controls from a standoff position when said restraint means is moved to an operating position; and c) providing an interlock control to prevent operation as a function of rotation of a cutter wheel of the stump cutter when the control console is not positioned and latched in said operating configuration.

* * * * *